J. T. ANDREW.
SAFETY APPLIANCE FOR RAILWAY CARS.
APPLICATION FILED APR. 9, 1910.

965,679.

Patented July 26, 1910.

Witnesses
B. B. Collings
Louis H. Graves Jr.

Inventor
James T. Andrew
By Wilkinson, Fisher & Witherspoon
Attorneys.

UNITED STATES PATENT OFFICE.

JAMES T. ANDREW, OF MONTGOMERY, ALABAMA.

SAFETY APPLIANCE FOR RAILWAY-CAR 965,679.

Specification of Letters Patent. Patented July 26, 1910.

Application filed April 9, 1910. Serial No. 554,500.

*To all whom it may concern:*

Be it known that I, JAMES T. ANDREW, a citizen of the United States, residing at Montgomery, in the county of Montgomery and State of Alabama, have invented certain new and useful Improvements in Safety Appliances for Railway-Cars; and I do hereby declare the following to be a full, clear, and exact description of the invention, such as will enable others skilled in the art to which it appertains to make and use the same.

My invention relates to safety appliances for railway cars or locomotives and is a specific improvement over the construction shown in my Patent No. 897,864, dated September 8, 1908.

The object of my invention is to provide simple means whereby a pair of safety wheels may be secured upon any size of car axle, inside the regular running wheels, without taking down the car or taking one of the wheels from the axle.

With this object in view, my invention consists in the construction and combinations of parts as hereinafter described and claimed.

Figure 1:
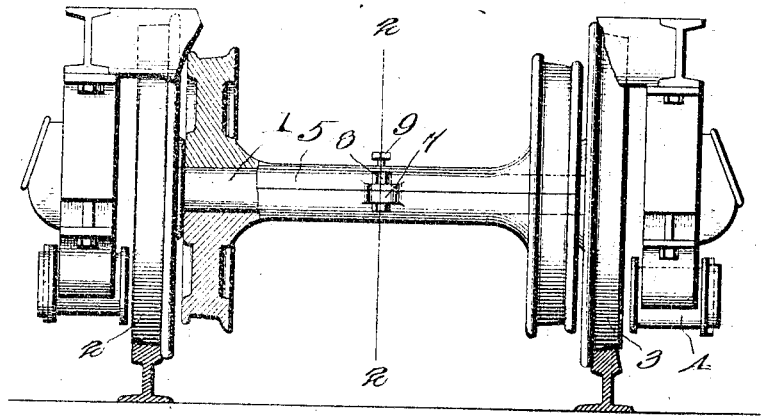
Figure 2:
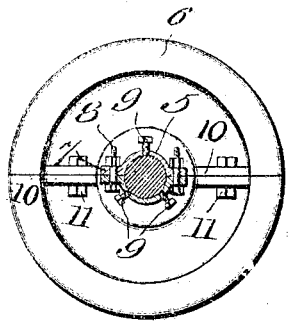

In the accompanying drawings—Figure 1 is an end view, partly in section, of my invention as applied to a pair of the wheels of an ordinary truck, and Fig. 2 is a cross-section on the line 2—2 of Fig. 1.

1 represents a car axle provided with the usual wheels 2 and 3 and with the safety appliance 4 applied on the outside, all as described in my Patent, No. 897,864.

5 represents a semi-cylindrical shell, adapted to fit upon the axle 1, and on each end of the shell 5 is a half wheel 6. At the center, the shell 5 is provided on each side with a lug 7, perforated to permit the passage of a bolt 8.

In use, a similarly shaped but oppositely arranged shell is used, provided with half wheels at each end. The lugs are adapted to fit up against each other, as shown in Fig. 2, and to be firmly fastened together by the screws 8, closely embracing the axle 1.

9 represents a plurality of set screws, at least three in number, which serve to fasten the completed cylinder formed by the two shells on the axle 1, the safety wheels fitting firmly against the interior of the regular wheels 2.

The construction shown can be applied to any car truck without removing the same from the track or car, or without taking off any of the wheels.

The construction shown is strong enough for ordinary purposes, but, if desired, the two half wheels may be secured together by means of lugs 10 formed on the half wheels and secured together by bolts 11.

I claim:—

1. The combination of an axle and a safety appliance adapted to be secured thereto, consisting of two semicylindrical shells each provided with projecting lugs, and with a half wheel at each end, bolts passing through said lugs to hold the shells together, and set screws passing through said shells and engaging said axle, substantially as described.

2. The combination of a car axle and a safety appliance secured thereto, said appliance consisting of two semicylindrical shells, each provided with a half wheel at each end, with projecting lugs, with bolts passing through said lugs to fasten the half shells together, with set screws, and means for fastening the two half wheels at each end together, substantially as described.

In testimony whereof, I affix my signature, in presence of two witnesses.

JAMES T. ANDREW.

Witnesses:
F. O. KING,
E. H. BEE.